United States Patent
Coteus et al.

(10) Patent No.: US 7,873,843 B2
(45) Date of Patent: Jan. 18, 2011

(54) STATIC POWER REDUCTION FOR MIDPOINT-TERMINATED BUSSES

(75) Inventors: Paul W. Coteus, Yorktown Heights, NY (US); Todd Takken, Brewster, NY (US)

(73) Assignee: International Business Machines Corporation, Armonk, NY (US)

(*) Notice: Subject to any disclaimer, the term of this patent is extended or adjusted under 35 U.S.C. 154(b) by 829 days.

(21) Appl. No.: 11/768,552

(22) Filed: Jun. 26, 2007

(65) Prior Publication Data

US 2009/0006683 A1 Jan. 1, 2009

(51) Int. Cl.
*G06F 1/26* (2006.01)
(52) U.S. Cl. .................. 713/300; 713/320; 713/323
(58) Field of Classification Search .......... 713/300, 713/320, 323
See application file for complete search history.

(56) References Cited

U.S. PATENT DOCUMENTS

| | | | |
|---|---|---|---|
| 6,219,300 B1 * | 4/2001 | Tamaki | 711/167 |
| 6,356,106 B1 * | 3/2002 | Greeff et al. | 326/30 |
| 6,564,331 B1 * | 5/2003 | Joshi | 713/324 |
| 7,239,565 B2 * | 7/2007 | Liu | 365/203 |
| 7,463,529 B2 * | 12/2008 | Matsubara | 365/185.23 |
| 7,698,581 B2 * | 4/2010 | Oh | 713/300 |
| 2005/0270886 A1 * | 12/2005 | Takashima | 365/232 |

* cited by examiner

*Primary Examiner*—Nitin C Patel
(74) *Attorney, Agent, or Firm*—Scully, Scott, Murphy & Presser, P.C.; Daniel P. Morris, Esq.

(57) ABSTRACT

A memory system is disclosed which is comprised of a memory controller and addressable memory devices such as DRAMs. The invention provides a programmable register to control the high vs. low drive state of each bit of a memory system address and control bus during periods of bus inactivity. In this way, termination voltage supply current can be minimized, while permitting selected bus bits to be driven to a required state. This minimizes termination power dissipation while not affecting memory system performance. The technique can be extended to work for other high-speed busses as well.

20 Claims, 3 Drawing Sheets

600 Programmable Register
Register determines inactive bus drive state for bits, in order to minimize termination power

| Bit | inactive bus drive state |
|-----|--------------------------|
| A0  | 0 |
| A1  | 0 |
| A2  | 0 |
| A3  | 1 |
| A4  | 0 |
| A5  | 0 |
| A6  | 0 |
| A7  | 1 |
| A8  | 0 |
| A9  | 1 |
| A10 | 0 |
| A11 | 1 |
| A12 | 0 |
| A13 | 1 |
| A14 | 0 |
| BA0 | 1 |
| BA1 | 0 |
| BA2 | 1 |
| RAS | 1 |
| CAS | 1 |
| WE  | 1 |

610 Other Programmable Bits
Bit state programmed based on desired function.

| Bit | bus default drive state |
|-----|-------------------------|
| ODT | 0 |
| CS  | 1 |

620 Nonprogrammable Bits
State hardcoded based on desired function.

| Bit | bus default drive state |
|-----|-------------------------|
| CKE | 1 (drops to 0 if no activity 30 cycles) |

FIG. 6

STATIC POWER REDUCTION FOR MIDPOINT-TERMINATED BUSSES

GOVERNMENT RIGHTS

This invention was made with Government support under Contract No.: B 554331, awarded by Department of Energy. The Government has certain rights to this invention.

CROSS-REFERENCE TO RELATED APPLICATIONS

The present invention is related to the following commonly-owned, co-pending U.S. patent applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. Pat. No. 7,694,035, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. Pat. No. 7,669,012, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. Pat. No. 7,680,971, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. Pat. No. 7,701,846, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. Pat. No. 7,761,687, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. Pat. No. 7,738,443, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

1. Field of the Invention

This invention generally relates to computer systems; and more specifically, the invention relates to connections, in computer systems, between controllers, for example memory controllers or intermediate buffer devices, and the addressable devices which they control.

2. Background Art

Contemporary high performance computing main memory systems incorporates memory as an array of DRAM memory devices. A processor communicates a memory request to a memory controller, which in turn activates one or more DRAM devices and then reads (fetches) or writes (stores) the data. The DRAM devices could be directly connected to the memory controller (direct connect), or there may be intermediate buffer chips, registers, or more complicated hub chips (essentially data funnels) between the memory controller and the DRAMs. The DRAMs are often organized on memory modules; the usual arrangement is a dual inline memory module (DIMM), which provides a convenient memory bus and an 8 Byte wide data bus to the memory controller.

High-speed memory systems may be provided with a feature referred to as receiver parallel termination, which dampen reflections from DRAMs in the systems. Such parallel termination can be implemented with a resistor voltage divider, comprised of one resistor from the signal net to the driver and/or receiver supply voltage (Vdd) and a second resistor from the signal net to the ground reference voltage (Gnd). This type of parallel termination is simple to implement but results in significant DC power dissipation due to current flowing directly through the termination resistors from Vdd to Gnd. In order to reduce power consumption, parallel termination is frequently implemented with a push-pull voltage supply 380, which provides a midpoint termination voltage (Vtt) between Vdd and Gnd.

For a multi-bit bus comprised of a number of nets, each of which is parallel terminated to the same Vtt supply, and for a realistic lossy Vtt supply, the total termination power of the bus varies with the difference between the number of nets driven high vs. low. Significant power savings can be obtained by controlling the state to which address and control bits are driven when the address and control bus is inactive.

SUMMARY OF THE INVENTION

An object of this invention is to provide power savings in the operation of computer systems.

Another object of the present invention is to provide static power reduction for midpoint-terminated busses in computer memory systems.

A further object of the invention is to realize power savings in a computer memory system while not adversely affecting memory system performance or function.

These and other objectives are attained with a method and system for reducing power consumption in a computer memory system. The memory system includes an array of memory devices, one or more bus lines connected to the memory devices, a driver subsystem for charging the memory devices, via said one or more bus lines, to high or low states, and a midpoint voltage source connected to the one or more bus lines. The method comprises the step of providing a programmable or non-programmable register for storing a series of control bits register exists and controls how bus bits are driven. The register can be made programmable for greater flexibility. Each of said control bits is associated with the state of a particular net (line, interconnect, receiver, control bus bit) of the control bus during periods of bus inactivity and identifying one of said high or low states for said associated memory device. During periods of bus inactivity, at least some of the memory devices are driven to high or low states in accordance with the control bits associated with said memory devices to reduce the drive current supplied by the midpoint voltage source.

In the preferred embodiment, an additional group of control bits may be set to defined levels in order to achieve a given memory operation, and further additional control bits may be hardcoded to defined levels in order to achieve another given memory operation. In addition, in the preferred embodiment of the invention, the driving step includes the steps of identifying BITS on the control bus that do not affect memory device (DRAM) operation during bus inactivity. This invention can be practiced beyond having only a midpoint-terminated voltage source. Future generations of DRAM may terminate to other voltages. In fact, future generations of DRAM will terminate to other voltages. With a programmable register, one has the flexibility to obtain the optimal balance between function (certain bits must be driven a certain way or device operation will be incorrect) and minimal power.

The control bits may be set to achieve a given ratio of bits on a given memory device's control bus receivers (or on multiple memory devices) in the high state vs. low state. The same control bus will commonly be driven to multiple memory devices. The same wires will touch multiple devices. So all memory devices will see the same drive states on their control bus inputs. All devices on the same bus will therefore always have their control bus receivers in the exact same state. These control bits may also be used to initialize long-term operation of the memory devices during power-on and reset periods of the memory system.

The preferred embodiment of the invention, described in detail below, provides a register to control the high vs. low drive state of each bit of a memory system address and control bus during periods of bus inactivity. The register may be programmable. In this way, termination voltage supply current can be minimized, while permitting selected bus bits to be driven to a required state. This minimizes termination power dissipation, while not affecting memory system performance. The technique can be extended to work for other high-speed busses as well. This technique could apply to most types of far-end terminated busses.

Further benefits and advantages of the invention will become apparent from a consideration of the following detailed description, given with reference to the accompanying drawings, which specify and show preferred embodiments of the invention.

BRIEF DESCRIPTION OF THE PREFERRED EMBODIMENTS

Figure 5:
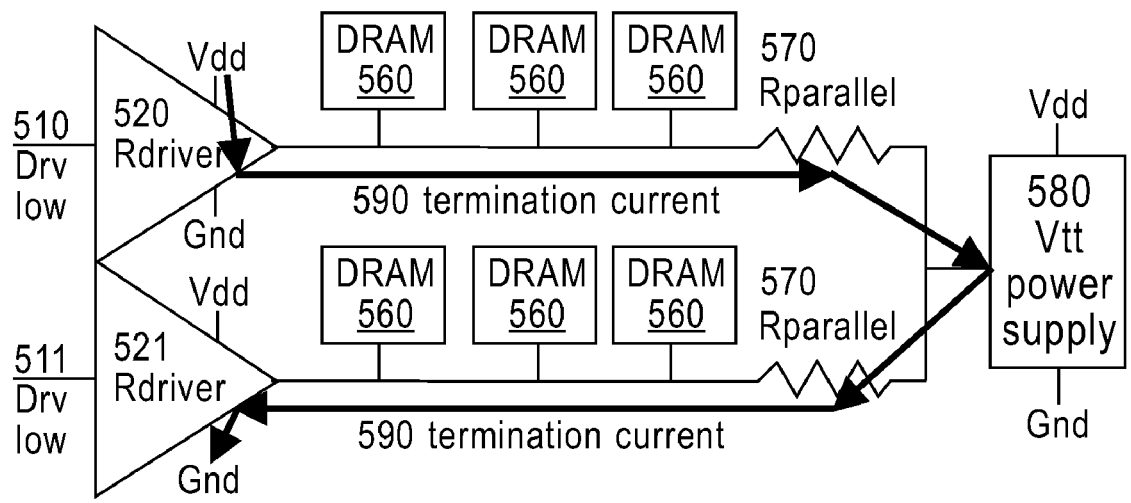

FIG. 5 also shows a memory system having parallel address and control busses, and illustrating lower termination power when bits are driven to opposite values.

FIG. 6 shows a programmable state drive register for controlling how individual address and control bits are driven during periods of control and address bus inactivity.

DETAILED DESCRIPTION OF THE PREFERRED EMBODIMENTS

As mentioned above, contemporary high performance computing main memory systems incorporates memory as an array of DRAM memory devices. A processor communicates a memory request to a memory controller, which in turn activates one or more DRAM devices and then reads (fetches) or writes (stores) the data. The DRAM devices could be directly connected to the memory controller (direct connect), or there may be intermediate buffer chips, registers, or more complicated hub chips (essentially data funnels) between the memory controller and the DRAMs. The DRAMs are often organized on memory modules; the usual arrangement is a dual inline memory module (DIMM), which provides a convenient memory bus and an 8 Byte wide data bus to the memory controller.

Figure 1:
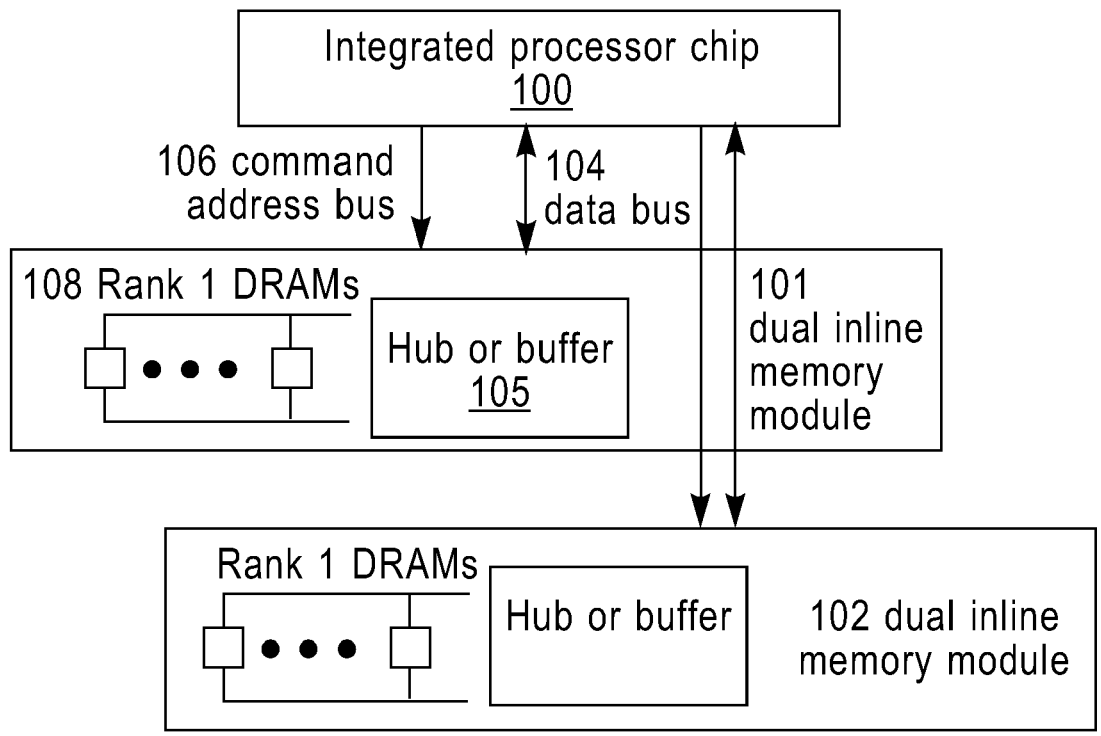
FIG. 1 illustrates a computer memory system in which the present invention may be used.

This is shown in FIG. 1 with integrated processor and memory controller chip 100, connecting two memory DIMMs 101 and 102. Each DIMM has a buffer chip 105, which repowers the address bus 104, and optionally could repower the data bus 106, else the data bus connects directly to the DRAMs 108.

Any suitable interface may be provided between the processor and the memory controller. Also, buffering between the memory controller and DRAM, as well as specific details of any such buffering, are not critical to the practice of the present invention. For example, the invention may be practiced with a simple system of an integrated processor and memory controller (called the processor chip) directly connected to the DRAM without a buffer device. In addition, DRAMs may be located or secured in place in any suitable way. For instance, the DRAMs may be, although they do not need to be, on a DIMM, or the DRAMs may be just directly soldered to the same circuit card as the processor chip.

Commonly, multiple (typically 2 or 4), identically configured physical networks of memory modules are logically grouped together in ranks, which share a data connection, and possibly an address connection, but which have a least one physical command line (rank control) differentiating them so that only one rank at a time is using the data bus. The two DIMMs 101 and 102 shown in FIG. 1 are operated in unison by the memory controller for optimal latency, bandwidth, and error correction effectiveness for system memory cache line transfer (typically 64B, 128B, or 256B). The memory controller translates system requests for memory access into commands for DRAM read and write, where a memory write request contains at least a command, address, and associated data, and a memory read request contain at least a command and address. Memory read packets imply an expected packet will be returned containing the data.

Figure 2:
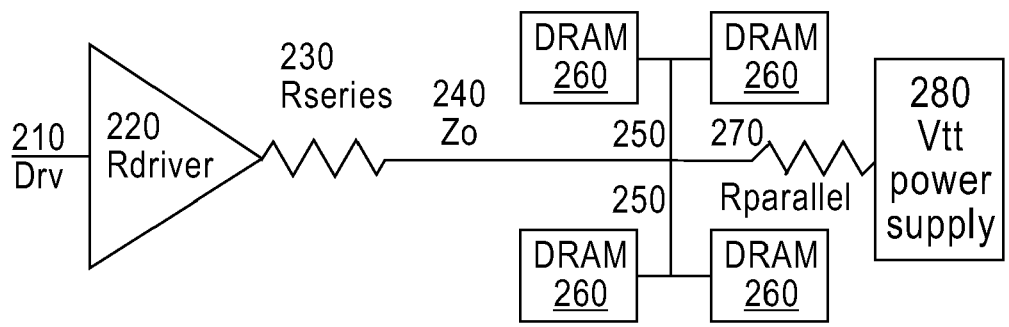
FIG. 2 shows a source-terminated command line that may be used in the memory system of FIG. 1.
Figure 3:
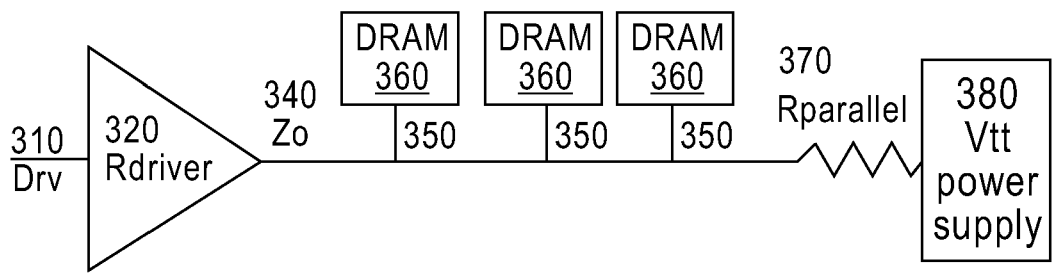
FIG. 3 shows a far end terminated command line that may be used in the memory system of FIG. 1.

Memory system control and address busses can be source terminated, as illustrated in FIG. 2. The on-impedance of the driver 220 plus the optional source series termination 230 damp reflections returning from the DRAMs 260 at the far end of the net. The highest speed operation on this class of net was obtained by clustering the receiver loads as closely as possible, with minimal stub length 250 to the end of the net. As operational speeds have increased, receiver parallel termination 270 has commonly been added, in order to maintain sufficient signal quality at higher speeds. Moderate receiver parallel termination 270 can be added to the receiver end of the clustered net topology, as shown in FIG. 2. Or, for optimal received signal quality on a multi-load net, the receiver loads can be arranged evenly along the net in a daisy chain topology, as shown in FIG. 3, and parallel termination 370 can be added at the far end of the net, with termination resistance 370 approximately equal to loaded line impedance.

Such parallel termination can be implemented with a resistor voltage divider, comprised of one resistor from the signal net to the driver and/or receiver supply voltage (Vdd) and a second resistor from the signal net to the ground reference voltage (Gnd). This type of parallel termination is simple to implement but results in significant DC power dissipation due to current flowing directly through the termination resistors from Vdd to Gnd. In order to reduce power consumption, parallel termination is frequently implemented with a push-pull voltage supply 380, which provides a midpoint termination voltage (Vtt) between Vdd and Gnd. The midpoint termination voltage is often the exact midpoint between Vdd and Gnd. However, it could be set to Vdd, Gnd or any voltage in between. This invention includes the flexibility to minimize static power dissipation while not affecting function, for any termination voltage.

As an example, the termination for a JEDEC standard SDRAM-DDR2 address and control bus could be supplied by a Phillips NE57814DD power converter operating at a Vtt termination voltage of 0.9 Volts, or half of the DDR2 SDRAM supply voltage Vdd of 1.8 Volts. A single termination resistor 370 is then connected between the far end of the net to be terminated and the Vtt supply. In this case, the power dissipated by the net includes the switching power required to charge the capacitance on the net to the high or low logic voltage of the net, plus the termination power. Termination power is defined as the power dissipated in the driver 320, termination resistance 370 and termination voltage power supply 380, due to the current flowing when a constant data value is driven. The termination power of an individual net is independent of whether the net is driven to a logical high or a logical low state, if the net is terminated to the voltage midpoint and if driver pull-up and pulldown strength are matched.

Figure 4:
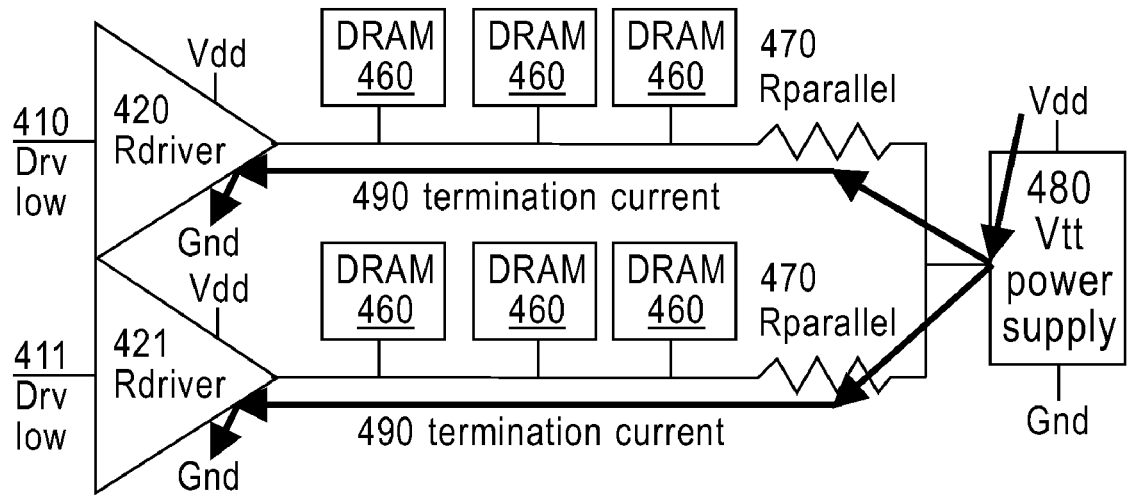
FIG. 4 shows a memory system having parallel-terminated address and control busses, and illustrating higher termination power when bits are driven to the same value.

Parallel-terminated address and control busses are shown in FIGS. 4 and 5. Although a simplified 2-bit bus is shown, the power savings apply equally well in the general case of any multi-bit bus. If the power supply 480 or 580 providing the Vtt termination voltage is ideal and lossless, the termination power of a parallel-terminated bus will also be independent of the state of bits on the bus. However, for cost and size reasons, Vtt termination voltage supplies 480 and 580 are often implemented with linear regulators, which dissipate significant power when they are sourcing or sinking nonzero current. For a multi-bit bus comprised of a number of nets each of which is parallel terminated to the same Vtt supply 480 or 580, and for a realistic lossy Vtt supply such as a linear regulator, the total termination power of the bus does vary with the difference between the number of nets driven high vs. low. If bits are driven to the same state 410 and 411 during periods of bus inactivity, then significant termination current 490 flows through the Vtt power supply 480, dissipating power in the supply. The lowest termination power is obtained for a ratio of bits driven high vs. driven low, so that the current sourced or sinked by the Vtt termination supply is smallest, as shown in FIG. 5. When bits are driven to opposite states 510 and 511 by drivers 520 and 512, most termination current 590 flows only through the control bus drivers 520 and 521 and the parallel termination resistors 570. The Vtt supply 580 sources or sinks very little termination current, leading to little or no power loss in the converter 580.

During the active operation, when drivers drive the bits of the bus to defined states and receivers read these states, it is possible to partially equalize the high vs. low bits on the bus by encoding the data. However, this has the disadvantage that it requires logic to calculate the encoding. This takes power, chip area, and may add latency. In addition, many memory receiver devices often use the bits of an address or control bus at power-on or reset time to define the configuration of the memory receiver devices. Encoding, if used, would have to be turned off during power-on and reset, adding complexity and making encoding less attractive. It is easier to control the state of the bits on a bus during periods of address inactivity, when it is not important which high or low state is received for many of the bits on the bus. The driver will still have to drive clearly defined high or low states to each bit of the bus, in order to prevent the receivers from dissipating power by quickly cycling between states. And some bits may have to be driven to specific states, in order to keep certain memory ranks, or banks open, to define the command being executed and to keep certain chips activated and ready to respond.

However, many bits of a memory system address and control bus can be driven to any defined state during periods of address inactivity. If no command is issued which requires a new address value to be transferred, then it does not matter which address is specified. Many memory controllers default to driving most bits low during periods of address and control bus inactivity. In addition, for many memory controllers and many data patterns, the address and control bus is in such an inactive state for the majority of the time the memory system is operating. In such cases, significant power savings can be obtained by controlling the state to which address and control bits are driven when the address and control bus is inactive. This invention provides a method and system to realize such power savings, while not adversely affecting memory system performance or function.

This invention, more specifically, provides a programmable inactive state drive register 600 as shown in FIG. 6. This register controls how most individual address and control bits are driven during periods of control and address bus inactivity. Their values are preferably set so that the net Vtt drive current of all address and control bits 600, 610 and 620 is minimized. A few bits 610 and 620 have to be set to defined levels in order to achieve the required memory controller operation. The system designers may choose to hardcode the function of some address and control bits, for example the bits 620 in FIG. 6, for cases where the bits determine a required memory controller function which is not expected to change. Other bits such as bits 610 in FIG. 6 are made programmable, but the choice of their state is determined by the desired memory controller function and does not vary between periods of address and control bus activity vs. inactivity. The remaining address and control bits do not affect memory controller operation during periods of address and control bus inactivity and can be grouped in inactive state drive register 600.

Making the inactive state of these bits programmable has several advantages. First, the inactive bus state termination power can still be minimized for cases where the driver and receiver impedances are not perfectly matched or when the Vtt termination voltage is not exactly at the midpoint between the Vdd voltage supply and the Gnd ground reference. Second, this bit-by-bit flexibility permits the user to initialize the long-term operational state of the memory receiver device during power on or reset periods, when certain key bits of the control and address bus are used to set the operation state. Third, this inactive state default drive programmability permits the user to drive certain key rank, bank and select bits in order to retain the memory devices in the desired active state of operation. By optimal programming of this inactive state drive register 600; the user can minimize overall termination power while not affecting memory system performance.

As will be readily apparent to those skilled in the art, the present invention or aspects of the invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out methods described herein. Alternatively, a specific use computer, containing specialized hardware for carrying out one or more of the functional tasks of the invention, could be utilized.

The present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for reducing power consumption in a computer memory system including a memory bus, an array of memory devices, a driver subsystem, and a termination voltage source, wherein the memory bus includes a multitude of bus lines connected to the memory devices, the driving subsystem is connected to the bus lines for charging the bus lines to high or low states, and the termination voltage source is connected to the bus lines through termination resistors, and wherein the memory bus has defined periods of inactivity, the method comprising the steps of:

providing a register for storing a series of predetermined register bits for setting the bus lines to predetermined states during said periods of inactivity, each of said predetermined register bits being associated with one of the bus lines, and identifying one of said high or low states for said associated bus line; and during said periods of inactivity of the memory bus, driving at least some of the bus lines to high or low states in accordance with the predetermined register bits to reduce the drive current supplied by the termination voltage source during said periods of inactivity.

2. A method according to claim 1, wherein at least some of the register bits are programmable.

3. A method according to claim 1, comprising the further step of setting an additional group of register bits to defined levels in order to achieve a given memory operation.

4. A method according to claim 1, comprising the further step of hardcoding all of said register bits to defined levels in order to achieve a given memory operation with minimal termination voltage supply current.

5. A method according to claim 1, wherein the driving step includes the step of:
identifying one or more of the bus lines that do not affect memory control operation during periods of inactivity of the memory bus; and
driving said one or more identified bus lines to reduce the drive current supplied by the termination voltage source.

6. A method according to claim 1, comprising the further step of setting said register bits to achieve a given ratio of bus lines in the high state vs. the low state.

7. A method according to claim 1, comprising the further step of using the register bits to initialize long-term operation of the memory devices during power-on and reset periods of the memory system.

8. A control system according to claim 7, wherein at least some of the register bits are programmable.

9. A control system according to claim 7, wherein an additional group of register bits are set to defined levels in order to achieve a given memory operation.

10. A control system according to claim 7, wherein all of said register bits are hardcoded to defined levels in order to achieve a given memory operation with minimal termination voltage supply current.

11. A control system according to claim 7, wherein:
the memory system identifies one or more of the bus lines that do not affect memory control operation during periods of inactivity of the memory bus; and
during said periods of inactivity of the memory bus, the driving subsystem drives said one or more identified bus lines to reduce the drive current supplied by the termination voltage source.

12. A control system according to claim 7, wherein said register bits are set to achieves a given ratio of bus lines in the high state vs. the low state, and said given ratio is determined based on at least one of the voltage of the termination voltage source and the ratio of pullup and pulldown drive strengths of the address and control bus drivers.

13. A control system according to claim 7, comprising the further step of using the register bits to initialize long-term operation of the memory devices during power-on and reset periods of the memory system.

14. A method for reducing power consumption in a computer memory system including a memory bus, an array of memory devices, a driver subsystem, and a termination voltage source, wherein the memory bus includes a multitude of bus lines connected to the memory devices, the driving subsystem is connected to the bus lines for charging the bus lines to high or low states, and the termination voltage source is connected to the bus lines through termination resistors, and wherein the memory bus has defined periods of inactivity, the method comprising the steps of:

providing a register for storing a series of register bits, each of said register bits being associated with one of the bus lines, and identifying one of said high or low states for said associated bus line;

during periods of inactivity of the memory bus, driving at least some of the bus lines to high or low states in accordance with the register bits to reduce the drive current supplied by the termination voltage source; and setting said register bits to achieve a given ratio of bus lines in the high states vs. the low state, and wherein said given ratio is determined based on at least one of the voltage of the termination voltage source and the ratio of pullup and pulldown drive strengths of the address and control bus drivers.

15. A control system for reducing power consumption in a computer memory system including a memory bus, an array of memory devices, a driver subsystem, and a termination voltage source, wherein the memory bus includes a multitude of bus lines connected to the memory devices, the driving subsystem is connected to the bus lines for charging the bus lines to high or low states, and the termination voltage source is connected to the bus lines through termination resistors, and wherein the memory bus has defined periods of inactivity, the control system comprising:

a register for storing a series of predetermined register bits for setting the bus lines to predetermined states during said periods of inactivity, each of said predetermined register bits being associated with one of the bus lines, and identifying one of said high or low states for said associated bus line; and wherein, during said periods of inactivity of the memory bus, the driver subsystem drives at least some of the bus lines to high or low states in accordance with the predetermined register bits to reduce the drive current supplied by the termination voltage source during said periods of inactivity.

16. A computer readable storage medium, tangibly embodying a program of instructions executable by the computer to perform method steps for reducing power consumption in a computer memory system including a memory bus, an array of memory devices, a driver subsystem, and a termination voltage source, wherein the memory bus includes a multitude of bus lines connected to the bus lines through termination resistors, and wherein the memory bus has defined periods of inactivity, the method steps comprising:

accessing a register for storing a series of predetermined register bits for setting the bus lines to predetermined states during said periods of inactivity, each of said register bits being associated with one of the bus lines, and identifying one of said high or low states for said associated bus line; and during said periods of inactivity of the memory bus, driving at least some of the bus lines to high or low states in accordance with the predetermined register bits to reduce the drive current supplied by the midpoint voltage source during said periods of inactivity.

17. A computer readable storage medium according to claim 16, wherein at least some of the register bits are programmable.

18. A computer readable storage medium according to claim 16, wherein the driving step includes the steps of:

identifying one or more of the bus lines that do not affect memory control operation during periods of inactivity of the memory bus; and driving said one or more identified bus lines to reduce the drive current supplied by the termination voltage source.

19. A computer readable storage medium according to claim 16, wherein the method steps comprise the further step of setting said register bits to achieve a given ratio of bus lines in the high state vs. the low state.

20. A computer readable storage medium according to claim 19, wherein said given ratio is determined based on at least one of the voltage of the termination voltage source and the ratio of pullup and pulldown drive strengths of the address and control bus drivers.

* * * * *